3,542,920
TETANUS VACCINE AND PROCESS FOR PREPARING IT
Hans Gerhard Schwick, Karl Heide, and Hans Biel, Marburg an der Lahn, Germany, assignors to Behringwerke Aktiengesellschaft, Marburg an der Lahn, Germany, a corporation of Germany
No Drawing. Filed Apr. 30, 1968, Ser. No. 725,525
Claims priority, application Germany, May 6, 1967, B 92,391
Int. Cl. A61r 27/00
U.S. Cl. 424—92                             4 Claims

ABSTRACT OF THE DISCLOSURE

A process for modifying tetanus toxoid by treatment with pepsin in the presence of urea; modified toxoid produced thereby; and tetanus vaccines produced from said modified toxoid.

---

The present invention relates to a tetanus vaccine and to a process for preparing it.

The known tetanus vaccines contain inactivated tetanus toxin, the so-called tetanus toxoid. Vaccines of this kind sometimes cause vaccination reactions and intolerances. No method has been described hitherto to eliminate these side-effects.

The present invention provides a tetanus vaccine which has been obtained by treating tetanus toxoid, obtained in known manner by cultivation of tetanus bacteria and subsequent isolation and inactivation of the toxin, with pepsin in the presence of urea, at a pH-value in the range of from 1.5 to 6.0, preferably 4.0 to 5.0, purifying it in known manner by means of a protein precipitating agent and working it up to a vaccine.

As starting material for the production of the vaccine of the present invention, there may be used tetanus toxoid which has been obtained in known manner by cultivation and tetanus bacilli, isolation and inactivation of the toxin and which is contained in the known vaccines (cf. Ullmanns Encyclopadie der technischen Chemie, 3rd edition, volume 15, page 611 et seq. (1964)). Surprisingly, the tolerance of these toxoids is improved by the process of the present invention. Since the tetanus toxoid is not soluble in the indicated acid pH-range, the treatment with pepsin according to the present invention is carried out in the presence of urea in an amount of, for example about 3–6, preferably 5 mols of urea/liter. In urea solution, the tetanus toxoid is also soluble in the acid pH-range, for example at pH 4.5. The relatively high urea concentration has no influence on the ferment activity of the pepsin. The treatment is suitably carried out with a pepsin concentration of 0.5 to 3.0, preferably 1 mg. of pepsin/100 mg. of tetanus toxoid. The duration of the action of the pepsin on the toxoid is determined by a preliminary test. It depends on the aggregation degree of the toxoid and is in the range of from 6 to 60 hours, preferably 24 to 48 hours. After the pepsin treatment, which is carried out at a temperature in the range of from 0 to 45° C., preferably at body temperature (37° C.), the active material is precipitated by means of a known protein precipitating agent, preferably the same volume of a saturated ammonium sulfate solution, in order to separate first the low molecular weight degradation products. The precipitate is then dissolved and fractionated by precipitation in two steps. A first precipitate, obtained up to an ammonium sulfate saturation of 22–30%, is inactive and is therefore rejected, whereas a second fraction, which is obtained up to a saturation of 50%, contains the pepsin-treated tetanus toxoid. For the fractionation, other known protein precipitating agents may also be used, for example methanol, ethanol or acetone. Before being used as a vaccine, the tetanus toxoid modified according to the present invention must still be filtered under sterile conditions. It may be used as so-called fluid-vaccine or it may be injected after combination with an adjuvant, for example aluminum hydroxide or aluminum phosphate. Compared to the known tetanus vaccines, the vaccine of the present invention has a considerably better tolerance. Also, it is highly active and storable for at least one year at 4°–6° C. without loss of activity. The tolerance of the vaccine prepared according to the present invention is good, measured by the pain upon movement of the vaccinated person and the metrically determined diameter of the local vaccination reaction.

Another proof of the tolerance of the vaccine was obtained by active anaphylactic tests on guinea pigs. When guinea pigs are immunized with an antigen and the same antigen is administered intravenously to them after two or three weeks, they suffer a shock and die. This is likewise the case when the tetanus toxoid of the state of the art or a tetanus vaccine which is available in the commerce is used as the antigen. All of ten guinea pigs treated in such manner died. When, however, the guinea pigs immunized with tetanus toxoid were injected with the vaccine of the present invention, a considerably better tolerance was observed: out of ten guinea pigs, six survived the described anaphylaxis test.

The activity of the vaccine of the present invention was determined by reinforcing vaccinations. When in an acute case, for example in the case of injuries, it is necessary to rapidly obtain a high antibody level, a reinforcing vaccination or a booster vaccination is administered. The "booster effect" is an increase in immunity with a steep increase in the antibody titer brought about by a reinforcing vaccination after an earlier basic immunization.

The test was effected on 141 test persons. In this test, a tetanus toxoid (starting product), obtained in known manner by cultivation of tetanus bacteria and following isolation and inactivation of the toxin by means of formaldehyde, was compared with the vaccine of the present invention. All test persons had already been immunized against tetanus.

The tetanus toxoid contained 10 $L_f$/ml., the vaccine of the present invention contained 5 $L_f$/ml. (by $L_f$=*Limes floculationis*, there is to be understood the quantity of antigen which flocs out 1 I.U. of specific antiserum). All test persons received a dose of 0.5 ml. The following table shows the protective units (I.U. of antitoxin/ml. of serum of the test persons) after the reinforcing vaccination with tetanus toxoid and the vaccine of the present invention.

| Serum antitoxin content (I.U./ml.) | Number of persons (and percentage of total) showing this antitoxin content after reinforcing vaccination with— | | | |
|---|---|---|---|---|
| | Tetanus toxoid | | Vaccine of the present invention | |
| | No. | Percent | No. | Percent |
| $\geq 0.01 <0.1$ | 1 | =1.5 | 0 | =0 |
| $\geq 0.1 <1.0$ | 8 | =11.5 | 3 | =4.0 |
| $\geq 1.0 <10.0$ | 24 | =34.0 | 27 | =38.0 |
| $\geq 10.0$ | 37 | =53.0 | 41 | =58.0 |
| Total | 70 | =100.0 | 71 | =100.0 |

As is evident from the above table, the activity of the vaccine of the present invention is more pronounced in the two high titer classes and is thus considerably better than that of the tetanus toxoid. Furthermore, it is to be noted that this superior activity is exhibited even at a concentration of only 2.5 $L_f$/0.5 ml., i.e. with only half the quantity of antigen which had been contained in the tetanus toxoid solution (5.0 $L_f$/0.5 ml.).

The vaccine of the present invention is administered intramuscularly or deep subcutaneously.

The vaccine of the present invention shows sedimentation coefficients ranging between about 5.5 6.3S (40 to 100%) and 0.8 and 1.0S (60 to 0%).

The following examples illustrate the invention but they are not intended to limit it thereto:

EXAMPLE 1

100 ml. of a tetanus toxoid solution, obtained by cultivation of tetanus bacteria in known manner and subsequent isolation and inactivation of the toxin, the protein content of which amounted to 1.5% and the pH-value of which had been adjusted to 4.5 by means of about 0.5 ml. of 2 N acetic acid, were combined with 30 g. of urea and then with 15 mg. of pepsin and the solution was incubated at 37° C. The duration of the action was determined by a preliminary test. It depends on the degree of aggregation of the toxoid and was in the present case 24 hours.

The solution was then adjusted to pH 7.0 by means of about 1.35 ml. of 1 N-NaOH and combined with the same volume, i.e. about 138 ml. of a saturated ammonium sulfate solution. Thereupon, the toxoid precipitated; it was isolated by centrifugation, dissolved in 50 ml. of a physiological NaCl solution and again combined with about 18.5 ml. of a saturated ammonium sulfate solution. This precipitate was rejected. The decanted portion was dialyzed until free from salt and concentrated.

Preliminary test

Samples were taken after 6, 12, 18, 24, 30, etc. hours and tested for their degree of degradation by starch-gel electrophoresis. Since the size of the molecules is decisive for the speed of migration in the starch gel owing to the sieving effect, starch-gel electroporesis can be used for proving the reduction of the size of the molecules.

In this electrophoresis, it was found that the vaccine of the present invention migrated faster than the starting product. Aggregations which were contained in the starting material, which were manifested in starch-gel electrophoresis by a slower migrating zone, were no longer present in the preparation of the present invention. The reduction of the size of the molecules could also be proved by measurement of the sedimentation coefficient with the aid of an ultracentrifuge. Thus, it was found that the starting material had a sedimentation coefficient of 6.5S, whereas the product of the present invention had a sedimentation coefficient of 5.8S.

EXAMPLE 2

100 ml. of tetanus toxoid, whose protein content amounted to 1.5% and whose pH-value was adjusted to 4.0 by means of about 0.5 ml. of 2 N acetic acid, were dialyzed against 0.003 molar acetate buffer having a pH-value of 4.0 and bound to urea in a molar ratio of 6:1 and containing 0.85% of sodium chloride. Then, 15 mg. of pepsin were added and the solution was incubated for 28 hours at 37° C. The degradation product was then purified in a manner analogous to that described in Example 1.

We claim:

1. A process for preparing a modified tetanus toxoid which comprises combining tetanus toxoid, pepsin, and urea in solution at a pH of 1.5 to 6, the pepsin being present at a concentration of 0.5 to 3.0 mg. per 100 mg. of toxoid and the urea being present at a concentration of 3 to 6 mols per liter, maintaining the solution at a temperature of 0° C. to 45° C. for from 6 to 60 hours until a modified toxoid having sedimentation coefficients between 5.5 and 6.3S (40 to 100%) and between 0.8 and 1.0S (60 to 0%), as determined by preliminary test, is obtained, and then recovering and purifying the modified toxoid by fractional precipitation with a protein precipitant.

2. A process as in claim 1 wherein the modified tetanus toxoid obtained by the process is then made into a vaccine having an antigen content, measured by the Limes floculationis ($L_f$), of at least $5L_f$/ml.

3. A modified tetanus toxoid prepared by the process of claim 1.

4. A tetanus vaccine prepared by the process of claim 3 having an antigen content, measured by the Limes floculationis ($L_f$), of at least $5L_f$/ml.

References Cited

FOREIGN PATENTS

| 115,543 | 7/1965 | Czechoslovakia. |
| 166,463 | 5/1965 | U.S.S.R. |

OTHER REFERENCES

Chemical Abstracts, vol. 59, entry 8001c, 1963.

Perlmann, Archives of Biochemistry and Biophysics, vol. 65, pp. 210–217, 1956.

RICHARD L. HUFF, Primary Examiner